(12) United States Patent
Ranjan

(10) Patent No.: US 7,173,608 B2
(45) Date of Patent: Feb. 6, 2007

(54) BLUETOOTH-ENABLED PEN

(75) Inventor: Nisheeth Ranjan, East Palo Alto, CA (US)

(73) Assignee: America Online, Inc., Dulles, VA (US)

( * ) Notice: Subject to any disclaimer, the term of this patent is extended or adjusted under 35 U.S.C. 154(b) by 684 days.

(21) Appl. No.: 09/993,429

(22) Filed: Nov. 13, 2001

(65) Prior Publication Data

US 2003/0092385 A1    May 15, 2003

(51) Int. Cl.
*G09G 5/00* (2006.01)
(52) U.S. Cl. ............... 345/179; 345/173; 345/180; 178/19.01; 178/19.02; 178/20.01; 382/187; 382/188; 382/189
(58) Field of Classification Search ........ 345/179–180, 345/173; 178/19.01, 19.02, 20.01; 382/187–189
See application file for complete search history.

(56) References Cited

U.S. PATENT DOCUMENTS

| | | | | |
|---|---|---|---|---|
| 5,561,446 A * | 10/1996 | Montlick | ............. | 345/173 |
| 6,008,727 A * | 12/1999 | Want et al. | ............. | 340/572.1 |
| 6,577,299 B1 * | 6/2003 | Schiller et al. | ............. | 345/179 |
| 2002/0042762 A1 * | 4/2002 | McQuade et al. | ............. | 705/29 |
| 2002/0145596 A1 * | 10/2002 | Vardi | ............. | 345/179 |
| 2003/0046184 A1 * | 3/2003 | Bjorklund et al. | ............. | 705/26 |
| 2003/0169864 A1 * | 9/2003 | Lapstun et al. | ............. | 379/201.01 |

* cited by examiner

*Primary Examiner*—Richard Hjerpe
*Assistant Examiner*—Leonid Shapiro
(74) *Attorney, Agent, or Firm*—Michael A. Glenn; Glenn Patent Group

(57) ABSTRACT

The method and system of the present invention allows a user to make notes on a paper book, where the information is transmitted to and overlaid on an online electronic duplicate of the book through a Bluetooth-enabled pen. The system and method of the present invention provides extension of the user's off-line experiences to an online environment, which may have application in electronic reading, writing, and shopping.

12 Claims, 3 Drawing Sheets

BLUETOOTH-ENABLED PEN

BACKGROUND OF THE INVENTION

1. Field of the Invention

The invention relates to wireless transmission of information. More particularly, the invention relates to a system and a family of methods that provide for a Bluetooth-enabled pen for entering information on a paper media and transferring the information from the paper media to an electronic or online duplicate of the paper media.

2. Description of Related Technology

There are many reasons why users may prefer to use off-line experiences of working with paper media while they read or write. Reading from books, magazines, or shopping catalogs in paper form is easier and less intrusive to the eyes and the posture, because paper media are generally light, compact, portable, and not illuminating any of the harmful light associated with computer screens. In addition, the older generations, who have had longer experience working with paper media, find it less efficient and more troublesome to work with electronic online media.

Currently, online shoppers cannot conveniently search, view, and select their desired products or services from their favorite online providers the same way they efficiently would, if they had the shopping catalog in paper form in front of them.

There is a need, therefore, for online service providers to provide online users with the ability to read, make a note, search, view, and select their favorite items off-line using paper media, while the information entered on the paper media is automatically overlaid on the electronic duplicate of the paper media. There is also a need for online shopping service providers to attract and retain more users who prefer to shop using off-line experiences of working with paper shopping catalogs.

SUMMARY OF THE INVENTION

One presently preferred embodiment of the invention provides a system and a method for wireless transmission of information from a first media to a second media, including the steps of entering the information on the first media, such as paper book, and transferring the information from the first media to the second media, such as an online or electronic book. In one aspect of the invention, the information may be entered and transferred via a Bluetooth-enabled pen.

Another presently preferred embodiment of the invention provides an apparatus for online transmission of information from a first media, such as a paper book, to a second media, such as an electronic or online book. The device may include a marking device, which is configured to enter the information on the first media, and a transmitter, which is configured to transmit the information entered on the first media to the second media. In one aspect of the invention, the information may be entered and transferred via a Bluetooth-enabled pen.

DETAILED DESCRIPTION OF THE INVENTION

The invention contemplates a new and unique system and a family of methods for reading, writing, and shopping using paper media and a pen in an electronic or online environment. The disclosed method may be implemented in a network of computer systems, such as the Internet. The computer systems may include user terminals, storage devices, processing units, input and output devices, and networking devices and software modules.

Figure 1:
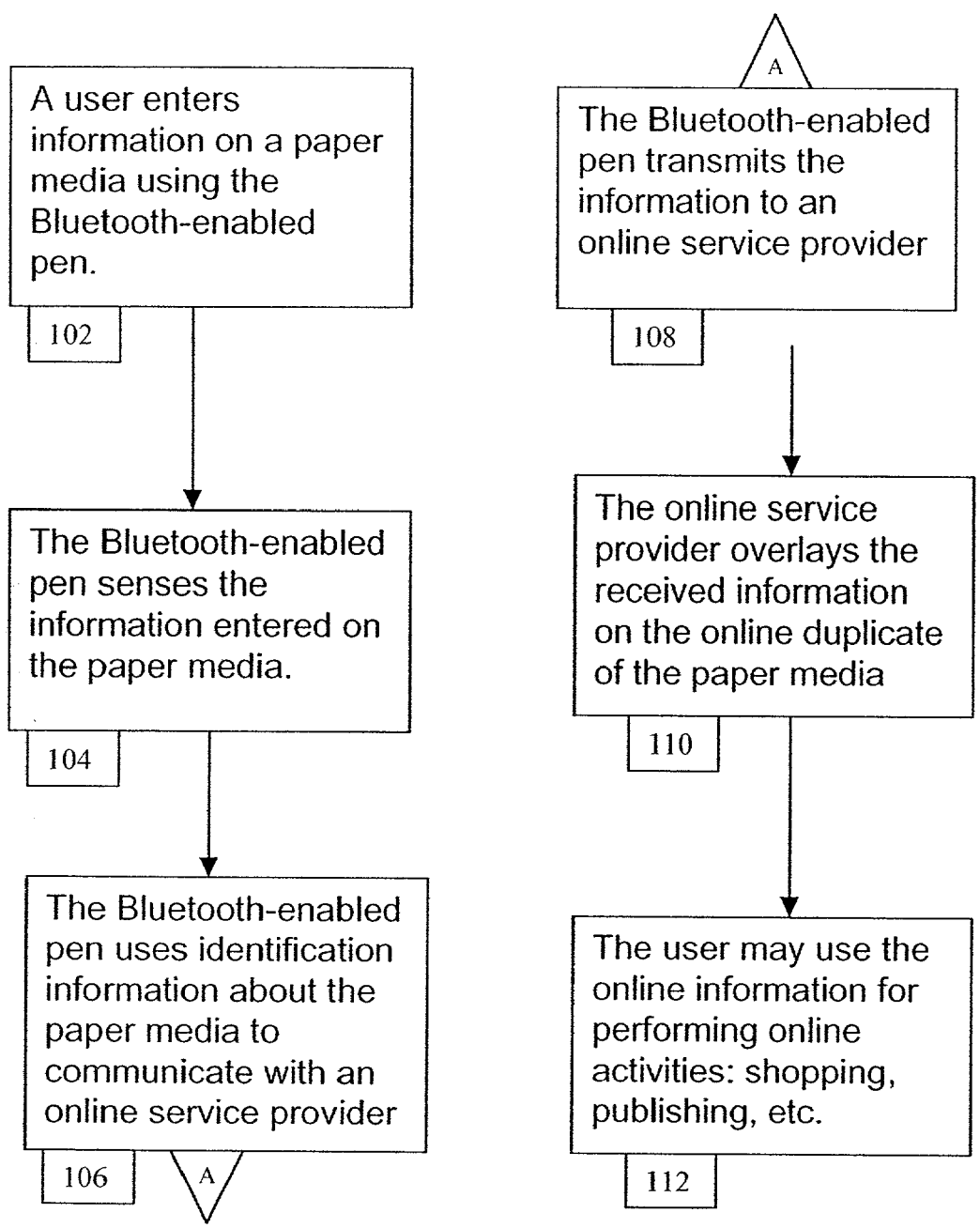
FIG. 1 shows a representation of one embodiment of the present invention.

FIG. 1 shows a representation of a process for extending off-line experiences of working with paper media to an online environment, according to one embodiment of the invention. A user may sign onto an online service provider's Web page, and access an online media, as is well known in the art. The online media may include an electronic version of a book, magazine, journal, shopping catalog, accounting and tax materials, logbook, or any online-published material. The user may desire to enter data, edit, make a note, or make a selection of item on one of the above-mentioned online-published materials. According to one embodiment of the present invention, the user may perform such activities on a duplicate paper media of such electronic media, and have such information transferred or overlaid from the paper media to the corresponding electronic media, as described below.

Figure 2:
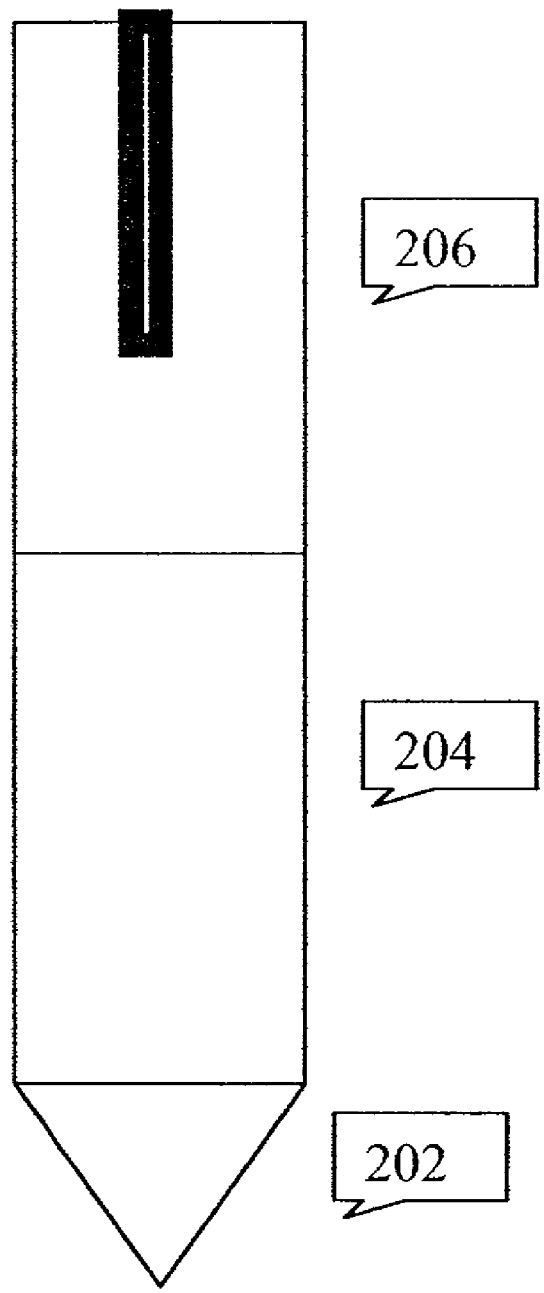
FIG. 2 shows a representation of an exemplary Bluetooth-enabled pen.

In step 102, the user may enter information on the paper media, e.g., using a writing device, such as a pen. Entering the information may include editing, circling, underlining, highlighting, making a note, and/or making a selection of an item on a paper media. According to one embodiment, as shown in FIG. 2, the pen may include a marking device 202, such as an ink-operated pen, for example, for entering the information on the paper media. The pen may also include a receiver device 204 and a transmitter device 206. The receiver device 204 may include sensing devices for capturing the information that is entered on the paper media through the marking device. The transmitter device 206 may include transmission devices for transmitting to the electronic media the information that is entered on the paper media through the marking device and received through the receiver device. In one embodiment, such pens may include wireless transmission devices, which may be based on ad-hoc wireless networks such as Bluetooth, IEEE 802.11 protocols, or ultra wide band, for example.

Bluetooth communication protocol provides a simple and short range, e.g., 10 m to 100 m, radio-based solution for robust data transfer without cables or the need for line of sight. It provides many advantages such as low complexity, low power consumption, and low cost Bluetooth devices that come within the range of each other may dynamically set up ad-hoc point-to-point and/or point-to-multipoint wireless connections. This standard is suitable for battery-powered pens. Bluetooth communication protocol is well known in the art.

IEEE 802.11 communication protocol provides device-to-device connectivity on an ad-hoc basis in a wireless local area network (WLAN) environment. This wireless communication standard has higher data rates, longer range, e.g., up to 90, but higher power requirements. This standard is suitable for non-battery-powered devices. IEEE 802.11 communication protocol is well known in the art.

Ultra wide band communication protocol also provides device-to-device connectivity on an ad-hoc basis. It provides flexible, low cost implementation of direct communication for short distances. This ad-hoc communication protocol is also well known in the art.

In step 104, the exemplary Bluetooth-enabled pen senses the information that is entered on the paper media by being in the close proximity of the paper media. According to one embodiment, the paper media may include an identification information or code, such as a radio frequency (RF) tag, which may be activated when the pen is positioned in close proximity of the paper media. In one embodiment, when the user writes with the pen on a paper media, the following pieces of information may be captured digitally: a) the motion of the pen itself, b) a digital video of the area above the tip of the pen, and c) the page number encoded in an RF tag embedded into the page, for example.

In step 106, the exemplary Bluetooth-enabled pen may use the identification information or code that may be embedded in the paper media to identify and communicate with the electronic or online environment that maintains the electronic duplicate of the paper media. In one embodiment, the electronic environment may include a computer system, a network of computer systems, and/or a global communications network, such the Internet.

In step 108, according to one embodiment, the transmitter device may use the identification information that may be embedded in the paper media, such as the RF-tag, to identify and transmit the information that is entered on the paper media to the electronic or online duplicate media of the paper media. In one embodiment, the paper media and its electronic duplicate may be linked together by the identification information, such as the RF-tag, which may be embedded in the paper media. The pen contains the requisite hardware to capture the motion of the pen, record a digital video of the area above the tip of the pen, e.g. half an inch above the pen, read the RF-tag, and transmit this information wirelessly using the Bluetooth protocol.

In step 110, the information that is transmitted to the electronic media may be entered, copied, or overlaid on the electronic media, to reflect the same information that the user entered on the counterpart paper media. Once the captured information pieces, such as those in a), b), and c) above, are transmitted to the computer, if the motion of the pen corresponds to underlining or circling, the software may use optical character recognition (OCR) technology on the frames of the digital video to piece together the words on the paper media that were underlined or circled. Once it is known which words are being underlined or circled, the online copy of the paper media may be annotated accordingly.

If the motion of the pen corresponds to writing notes, the software may run the digital image of the entire note through handwriting recognition algorithms to convert the image into a digital stream of text characters. The frames of the digital video may be used to figure out the printed words close to which the handwritten note was written. Once those printed words are known, the software determines the approximate area on the online copy of the paper media where the handwritten note should be overlaid. The software stores the raw image of the handwritten note as well as the digital representation of the characters in that image and associates both with the appropriate position on the online copy of the paper media.

After the information is overlaid on the electronic media, in step 112, the user may use the information-loaded online electronic media to perform online operations. In one exemplary application, the user may archive the information-loaded online electronic media for future references, email it to other persons, and/or publish it online or off-line.

In one application, the user may select some words in a paper-form text, e.g., by circling, underlining, or highlighting the words. When the user enters the electronic or online duplicate of the marked text, the user may be presented with the dictionary meaning of the user-selected words, in the context of the sentences occurring in the text. The selected words and their meanings may also pop up at the user for his review each time the user logs onto the online service provider or accesses the electronic media.

In another application, the user may fill up an online purchase order for electronic shopping, by conveniently browsing and selecting the desired items from a paper-form shopping catalog.

In yet another application, the user may conveniently work on paper form of voluminous and complicated accounting, tax, and/or legal forms and documents in paper form for online filing, for example.

Figure 3:
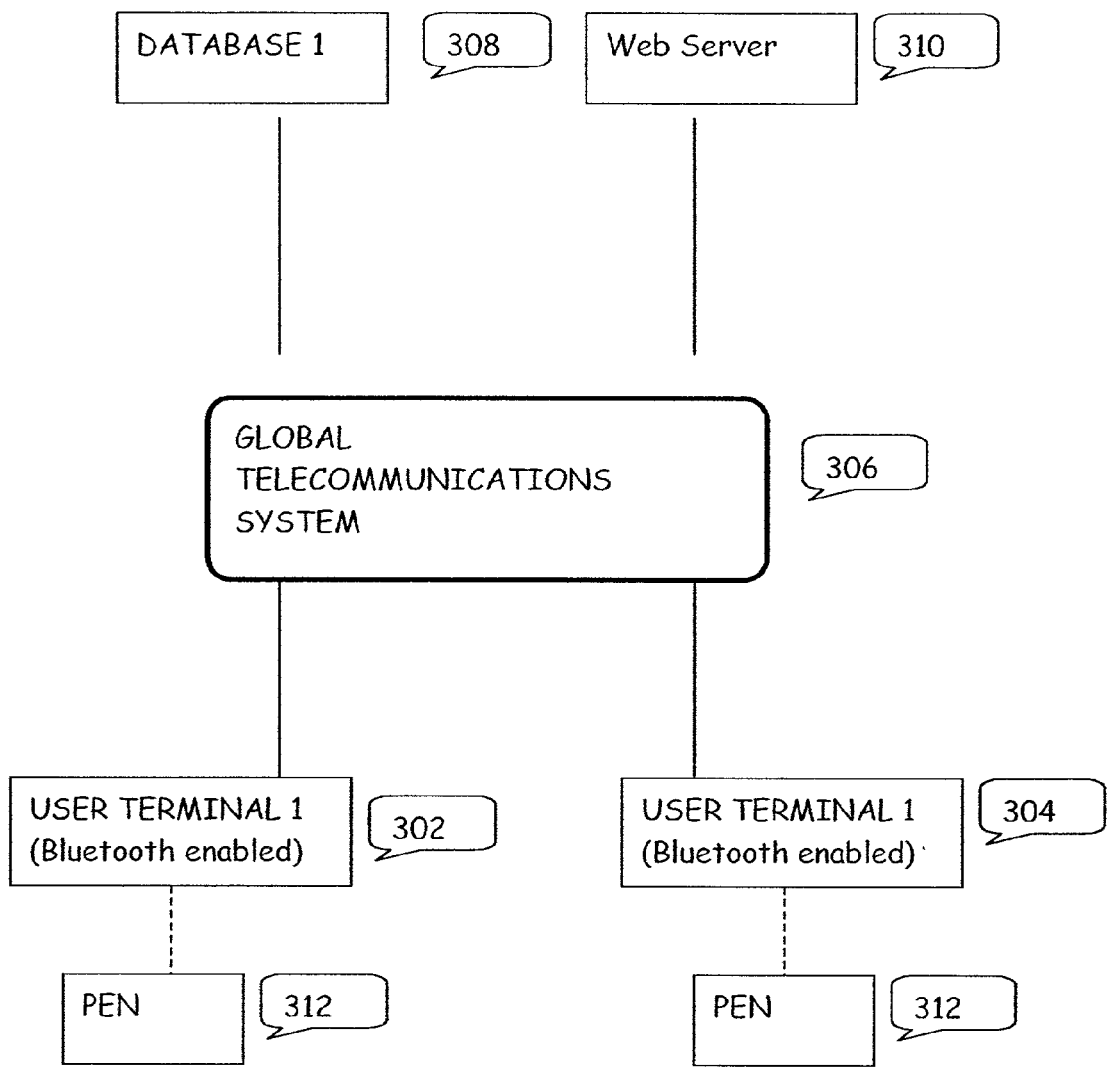
FIG. 3 shows a representation of an exemplary system for providing wireless transmission of information from a paper media to an electronic media, according to one embodiment of the invention.

FIG. 3 shows a representation of an exemplary system for providing wireless transmission of information from a paper media to an electronic media, according to one embodiment of the invention. User terminals 302, 304 may include the hardware and software modules to connect to global database 308 and Web server 310 through global telecommunication network 306, which may include the Internet. The user terminals may also include the necessary wireless data-transmission devices and software modules, such as Bluetooth, to communicate with writing devices 312, as described above.

The method and system disclosed herein provides efficient, instant, and convenient techniques for entering information on online electronic media. By working on the corresponding paper media, the method and system disclosed herein eliminates online browsing of voluminous documents, which, requires situating in front of a computer system for a long period of time, staring at harmful computer screens, and certain skill in navigating the Web. Instead, users may conveniently and leisurely use paper forms of the online documents to enter the desired information on the paper version of online documents, which information is automatically and instantly transferred to the electronic form of the documents.

Thus, the system and method enclosed herein saves time for online activities, such as reading, writing, and shopping, attracts more users who prefer working on paper media as opposed to electronic media on computer systems, and retains the present users of the online service providers.

Accordingly, although the invention has been described in detail with reference to particular preferred or exemplary embodiments, persons possessing ordinary skill in the art to which this invention pertains will appreciate that various modifications and enhancements may be made without departing from the spirit and scope of the claims that follow.

The invention claimed is:

1. An apparatus for online transmission of information from a first media to a second media, comprising:
   a marking device configured to enter said information on said first media; and
   a transmitter configured to transmit said information entered on said first media to said second media, said transmitter being connected to said marking device, said second media being an electronic duplicate of said first media, wherein said pen comprises a tip, and wherein said pen captures video capturing motion of said pen and said pen captures video of an area about half an inch above said tip of said pen.

2. The apparatus of claim 1, wherein said marking device comprises:

a pen.

3. The apparatus of claim 2, wherein said marking device further comprises:

a transmitter device; and a receiving device.

4. The apparatus of claim 3, further comprising:

a digital image capture device.

5. The apparatus of claim 3, further comprising:

means for ad-hoc connection to a Web server.

6. The apparatus of claim 1, wherein said first media comprises a paper media and said second media comprises an electronic media.

7. The apparatus of claim 6, wherein said first media comprises:

a paper book.

8. The apparatus of claim 6, wherein said first media comprises:

a paper magazine.

9. The apparatus of claim 6, wherein said first media comprises:

a paper shopping catalog.

10. The apparatus of claim 1, wherein said transmitter comprises:

a Bluetooth-enabled device.

11. The apparatus of claim 1, wherein said first media does not consist of a netpage form.

12. The apparatus of claim 1, wherein said first media further comprises:

a radio-frequency tag.

* * * * *